US008212380B2

(12) United States Patent
Okada

(10) Patent No.: US 8,212,380 B2
(45) Date of Patent: Jul. 3, 2012

(54) POWER SOURCE APPARATUS AND IMAGE FORMING APPARATUS

(75) Inventor: Masanori Okada, Osaka (JP)

(73) Assignee: Kyocera Mita Corporation (JP)

( * ) Notice: Subject to any disclaimer, the term of this patent is extended or adjusted under 35 U.S.C. 154(b) by 564 days.

(21) Appl. No.: 12/410,956

(22) Filed: Mar. 25, 2009

(65) Prior Publication Data

US 2009/0244941 A1 Oct. 1, 2009

(30) Foreign Application Priority Data

Mar. 27, 2008 (JP) ................................ 2008-082544

(51) Int. Cl.
*H02J 3/02* (2006.01)
*H02J 1/10* (2006.01)
*H02M 7/02* (2006.01)
*H02M 7/08* (2006.01)

(52) U.S. Cl. .................. 307/2; 307/18; 363/63; 363/67

(58) Field of Classification Search .................. 307/1–8, 307/17–26; 363/63, 65, 67, 69–71
See application file for complete search history.

(56) References Cited

U.S. PATENT DOCUMENTS 2,164,383 A * 7/1939 Burton .............................. 330/8
5,267,136 A * 11/1993 Suga et al. ...................... 363/65
6,016,258 A * 1/2000 Jain et al. ........................ 363/17
7,145,111 B2 * 12/2006 Hori ............................. 219/497
2004/0067078 A1 4/2004 An et al.
2007/0014131 A1 1/2007 Oh et al.
2007/0091657 A1 * 4/2007 Uchitani ......................... 363/65
2007/0139974 A1 * 6/2007 Aikawa et al. .................. 363/16
2007/0159862 A1 * 7/2007 Vinciarelli ...................... 363/65
2008/0265676 A1 * 10/2008 Cho et al. ........................ 307/31
2009/0257257 A1 * 10/2009 Adragna et al. ................ 363/65

FOREIGN PATENT DOCUMENTS

CN 1497382 5/2004
CN 1896882 1/2007
JP 2006-317524 11/2006

* cited by examiner

*Primary Examiner* — Adolf Berhane
*Assistant Examiner* — Gary Nash
(74) *Attorney, Agent, or Firm* — Gerald E. Hespos; Michael J. Porco

(57) ABSTRACT

A transformer accepts an AC voltage from an AC power source, transforms the AC voltage, and supplies the transformed AC voltage to first rectifying circuits. Similarly, another transformer accepts an AC voltage from an AC power source, transforms the AC voltage, and supplies the transformed AC voltage to second rectifying circuits. The first rectifying circuits convert the accepted AC voltage into a positive DC voltage, and the second rectifying circuits convert the accepted AC voltage to a negative DC voltage. The positive DC voltage and the negative DC voltage then are superimposed and outputted to a secondary side of a transformer in the AC circuits. The AC voltage outputted from the transformers in the AC circuits and the DC voltage formed by superimposing the positive and negative DC voltages outputted from the first and second rectifying circuits are further superimposed, and supplied to each developing section.

7 Claims, 11 Drawing Sheets

POWER SOURCE APPARATUS AND IMAGE FORMING APPARATUS

BACKGROUND OF THE INVENTION

1. Field of the Invention

The present invention relates to a power source apparatus which is capable of outputting a high voltage, and an image forming apparatus provided with the power source apparatus.

2. Description of the Related Art

In image forming apparatuses such as a printer, a complex machine, and the like adopting an electrophotographic method, image forming is performed by irradiating a light to a charged surface of a photosensitive drum to form an electrostatic latent image, supplying toner from a developing apparatus onto the surface of the photosensitive drum to form a toner image, and transferring the toner image onto a sheet. As power source apparatuses which generate a high voltage to be applied to the developing apparatus, there have been known power source apparatuses adopting a method of superimposing a DC voltage with an AC voltage or a method of generating an output voltage by superimposing a positive DC voltage with a negative DC voltage. Further, Japanese Unexamined Patent Publication No. 2006-317524 discloses a method of using a common transformer.

SUMMARY OF THE INVENTION

The present invention was made by further improving the aforementioned conventional technology.

In summary, according to an aspect of the present invention, a power source apparatus includes: a plurality of first transformers which transform an input voltage and outputs an AC voltage; a first DC power source including: one second transformer; and a plurality of first rectifiers which convert an AC voltage outputted from the second transformer into a positive DC voltage and output the positive DC voltage, the number of the first rectifiers being the same as the plurality of first transformers; a second DC power source including: one third transformer; and a plurality of second rectifiers which convert an AC voltage outputted from the third transformer into a negative DC voltage and output the negative DC voltage, the number of the second rectifiers being the same as the plurality of first transformers. A connection line is provided which superimposes the positive DC voltage outputted from the first rectifiers with the DC negative voltage outputted from the second rectifiers, and superimposes the superimposed DC voltage with the AC voltage outputted from the first transformers.

These and other objects, features and advantages of the present invention will become more apparent upon reading of the following detailed description along with the accompanied drawings.

DETAILED DESCRIPTION OF THE PREFERRED EMBODIMENTS

Hereinafter, a power source apparatus and an image forming apparatus in accordance with an embodiment of the present invention will be described with reference to the drawings. In the present embodiment, a printer will be described as an image forming apparatus. However, the image forming apparatus is not limited to a printer, and it may be a copying machine, a facsimile machine, and the like or a complex machine having functions of those.

Figure 1:
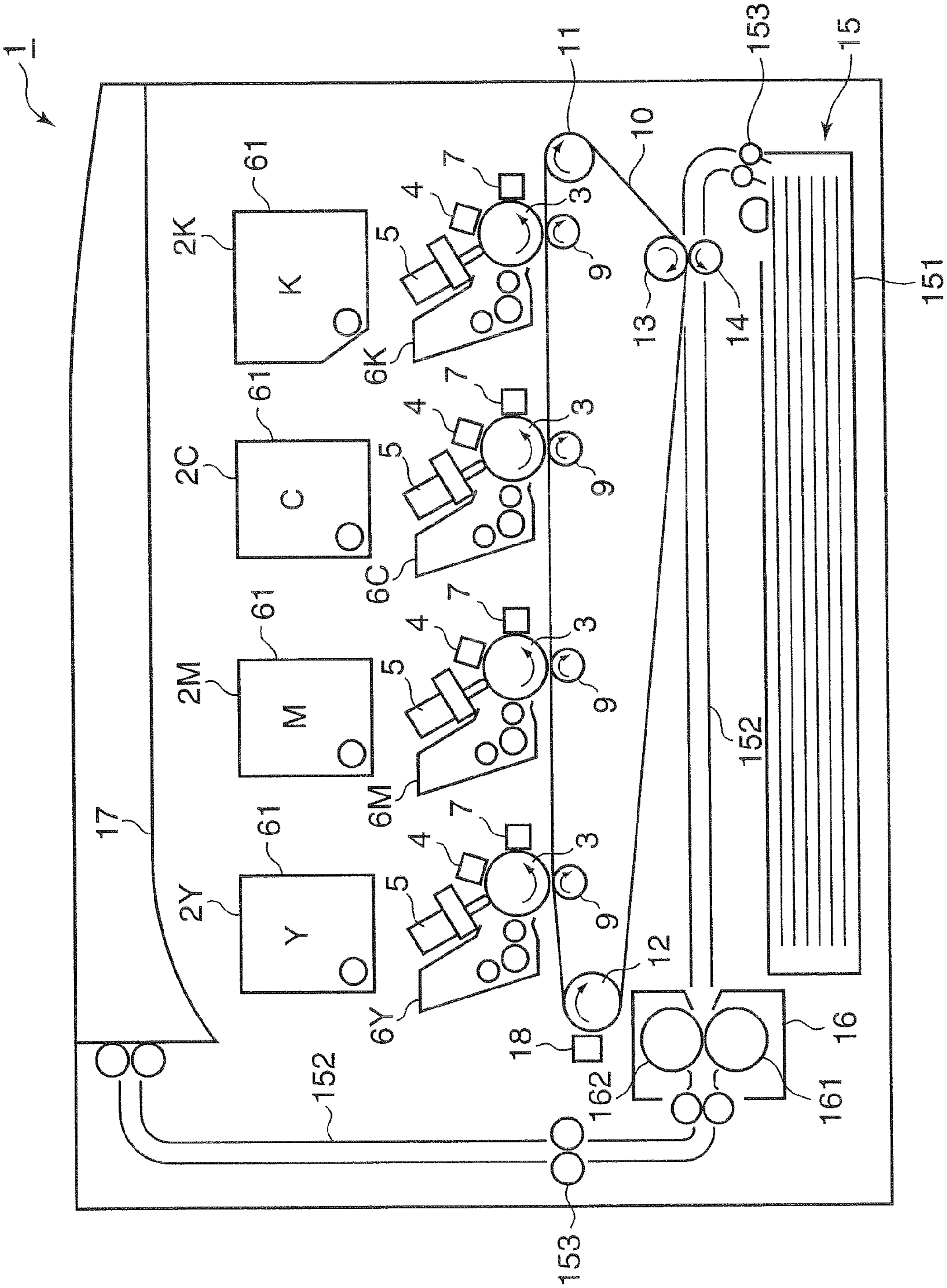
FIG. 1 is a sectional view schematically showing a printer.

FIG. 1 is a sectional view schematically showing a printer 1 in accordance with the present embodiment. As shown in FIG. 1, in an apparatus main body of the printer 1, image forming sections 2Y, 2M, 2C, and 2K (hereinafter, collectively referred to as "image forming section 2") for respective colors of yellow (Y), magenta (M), cyan (C), and black (K) are provided in line.

The image forming section 2 forms (prints) a color image onto a sheet and includes a photosensitive drum 3, and a charging section 4, an exposure section 5, a developing section 6 (developing sections 6Y, 6M, 6C, and 6K), and a photosensitive drum cleaning section 7 which are provided in periphery of the photosensitive drum 3.

The charging section 4 uniformly charges the surface of the photosensitive drum 3 at a predetermined electrical potential. The exposure section 5 irradiates a light, which is generated in accordance with image data stored in an image memory 32 which will be described later, to the photosensitive drum 3 to form an electrostatic latent image on the surface of the photosensitive drum 3. The developing section 6 allows toner supplied from a cartridge 61 to be attached to the electrostatic latent image formed on the photosensitive drum 3 to thereby allow the electrostatic latent image to appear as a toner image. The photosensitive drum cleaning section 7 removes toner attached to the surface of the photosensitive drum 3 after the toner image is primarily transferred to an intermediate belt 10 which will be described later.

The cartridges 61 accommodate toner of yellow, magenta, cyan, and black corresponding to the developing sections 6 and are so configured as to be detachably attached to the apparatus main body. When the amount of toner in the cartridge 61 becomes small, toner can be replenished to the apparatus main body by replacing the cartridge 61 with a new cartridge.

Under the image forming section 2, there are provided the intermediate transferring roller 9 and the intermediate belt 10 for intermediate transfer of the toner image which appears on the surface of the photosensitive drum 3. The intermediate belt 10 is a predetermined belt member which is so configured as to be rotated endlessly by driving rollers 11-13 in a state of being pressed against the photosensitive drum 3 by the intermediate transferring roller 9 which is so arranged as to face the photosensitive drum 3. The toner images of respective colors formed on the photosensitive drums 3 are transferred and superimposed in the order of yellow, magenta, cyan, and black onto the endlessly rotated intermediate belt 10 at right timings. Accordingly, a color image including four colors is formed on the intermediate belt 10.

At a position facing the driving roller 12, there is provided a charge-removal cleaning section 18 which removes toner (remaining toner) from the intermediate belt 10. At a position facing the driving roller 13, there is provided a secondary transfer roller 14 which transfers the color image from the intermediate belt 10 onto a sheet.

Further, the printer 1 includes a sheet-feeding section 15 which supplies a sheet to the image forming section 2. The sheet-feeding section 15 includes a sheet-feeding cassette 151 which stores a sheet, a conveying passage 152 through which a sheet is conveyed, a conveying roller 153 which conveys the sheet in the conveying passage 152, and the like. The sheet-feeding section 15 conveys a sheet taken one after another from the sheet-feeding cassette 151 to the image forming section 2, in other words, the position of the secondary transfer roller 14. Further, the sheet-feeding section 15 conveys the sheet, onto which the image is secondarily transferred, to a fixing section 16 and discharges the sheet, to which a fixing processing is applied, to a discharge tray 17 provided in an upper portion of the printer main body.

The fixing section 16 is provided at a suitable portion on a downstream side from the secondary transfer roller 14 in the conveying passage 152 and fixes the toner image transferred to the sheet. The fixing section 16 includes a pressing roller 161 and a heat roller 162 and fixes the toner by melting the toner on the sheet with heat applied by the heat roller 162 and applies a pressure with the pressing roller 161.

Figure 2:
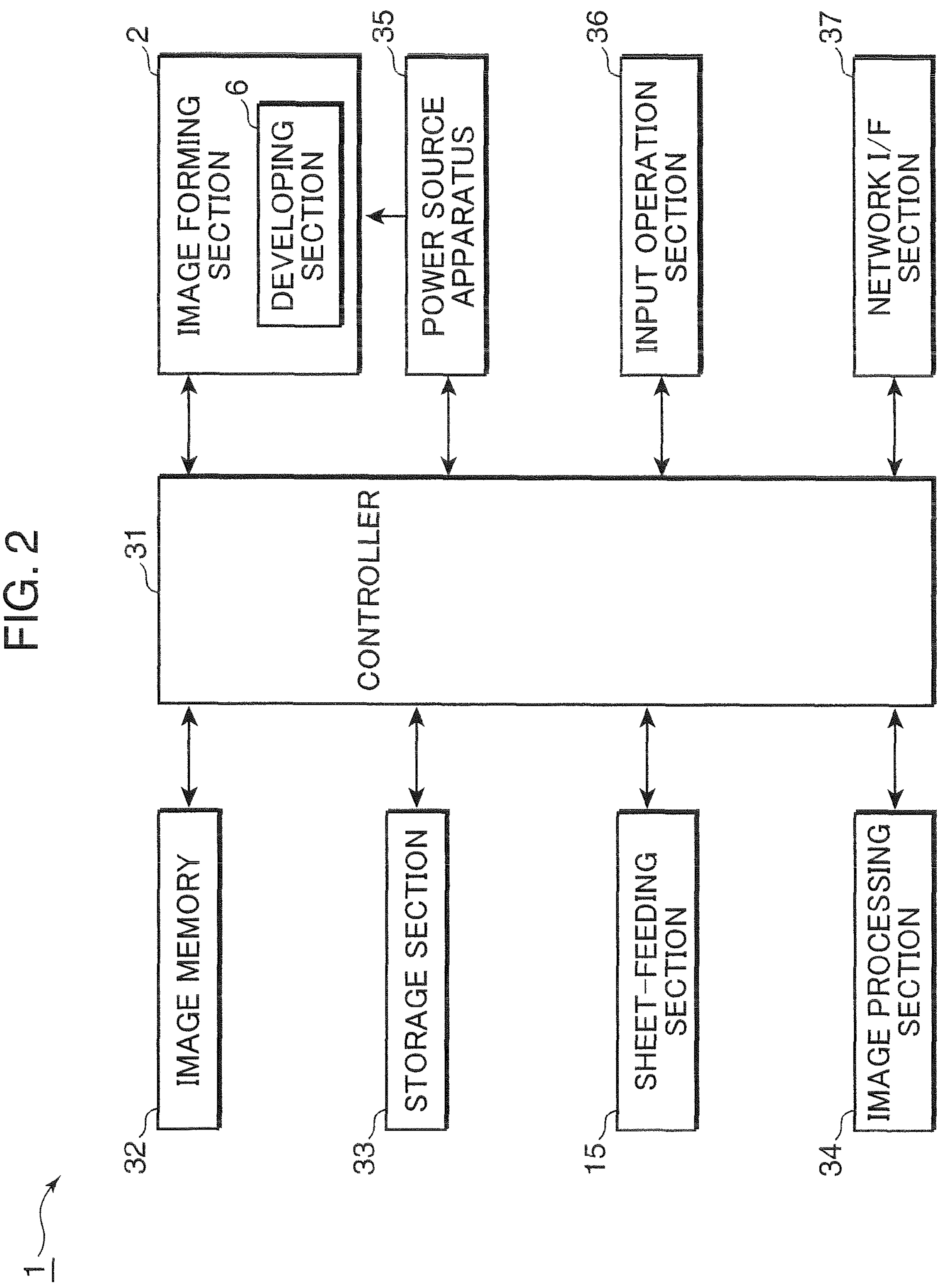
FIG. 2 is a function block diagram showing an electric configuration of the printer.

FIG. 2 is a function block diagram showing an electric configuration of the printer 1. The printer 1 includes a controller 31, an image memory 32, a storage section 33, the sheet-feeding section 15, an image processing section 34, the image forming section 2, a power source apparatus 35, an input operation section 36, and a network I/F section 37. It should be understood that elements which are the same as those described with reference to FIG. 1 will be identified by the same reference numerals, and detailed description regarding those will be omitted.

The controller 31 is configured by a CPU (Central Processing Unit) and the like. The controller 31 executes a processing in accordance with a predetermined program in response to an inputted instruction signal and the like to output an instruction signal to respective function sections and transfer data, thereby totally controlling the printer 1.

The image memory 32 temporarily stores image data which is transmitted from an unillustrated external apparatus (a personal computer and the like) through the network I/F section 37. The storage section 33 stores a program, data, and the like for realizing various functions of the printer 1. The image processing section 34 executes image processing such as image correction, enlargement/reduction, and the like to image data inputted through the network I/F section 37.

The power source apparatus 35 supplies a voltage to the developing section 6 of the image forming section 2. In particular, in accordance with the image data to which the image processing is executed by the image processing section 34, the controller 31 generates a control signal of respective colors of yellow, magenta, cyan, and black and outputs the control signal to the image forming section 2 and the power source apparatus 35. In accordance with the control signal of respective colors, the exposure section 5 of the image forming section 2 irradiates a light to the surface of the photosensitive drum 3, and the power source apparatus 35 changes the level of voltage supplied to the developing section 6.

The input operation section 36 includes a power key, a start button, setting keys for setting of functions, and a display panel which displays messages, and outputs an operation signal to the controller 31 if operation is performed by a user. The network I/F section 37 includes a communication module such as a LAN board, and performs communication of various data with an external apparatus through a network (not illustrated) connected with the network I/F section 37.

Figure 3:
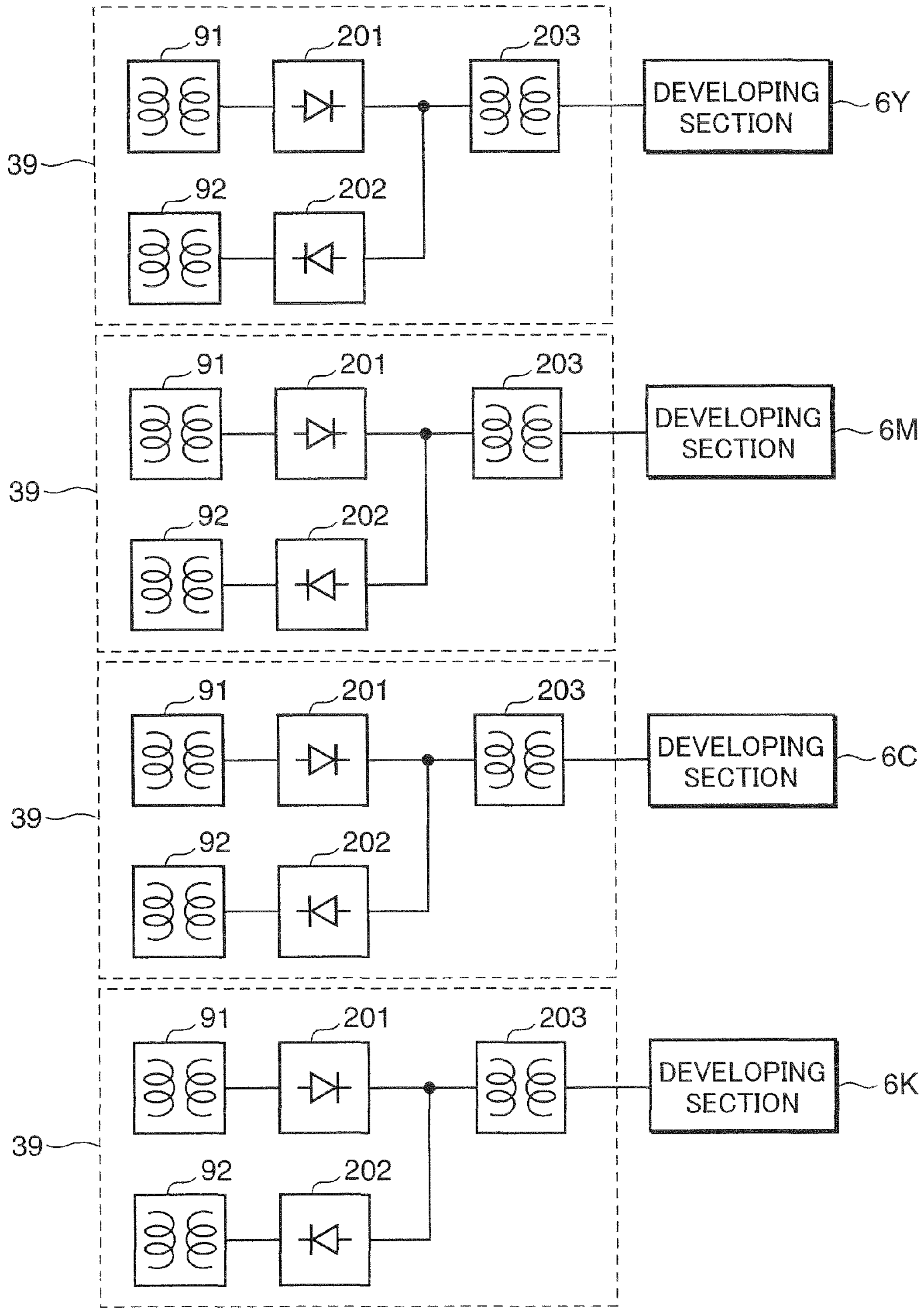
PRIOR ART FIG. 3
FIG. 3 is a schematic diagram showing a configuration of a conventional power source apparatus.

Next, the power source apparatus 35 will be described in detail. FIG. 3 is a schematic diagram showing a configuration of a conventional power source apparatus 39. The power source apparatus 39 includes transformers 91 and 92, rectifying circuits 201 and 202, and an AC circuit 203. The transformer 91 accepts an AC voltage from an unillustrated AC power source and transforms the AC voltage, and the rectifying circuit 201 converts the transformed AC voltage into a positive DC voltage. Similarly, the transformer 92 accepts an AC voltage from an unillustrated AC power source and transforms the AC voltage, and the rectifying circuit 202 converts the transformed AC voltage into a negative DC voltage.

The power source apparatus 35 is provided with a connection line which superimposes the positive DC voltage and the negative DC voltage with each other. The superimposed DC voltage is outputted to the AC circuit 203. The AC circuit 203 has a transformer inside and the superimposed DC voltage is outputted to a secondary side of the transformer. In other words, the AC voltage outputted from the transformer included in the AC circuit 203 and the superimposed positive and negative DC voltage outputted from the rectifying circuits 201 and 202 are further imposed with each other. The voltage including the DC voltage and the AC voltage superimposed with each other is supplied to the developing sections 6.

Conventionally, one power source apparatus 39 has been provided for one developing section 6. Thus, since a plurality of developing sections 6 are provided in a color printer like the printer 1, a plurality of power source apparatuses 39 are required. Accordingly, the number of parts such as transformers constituting each power source apparatus 39 has been large. Thus, there have been problems of difficulty in reducing the cost and making the size of the apparatus be small.

Figure 4:
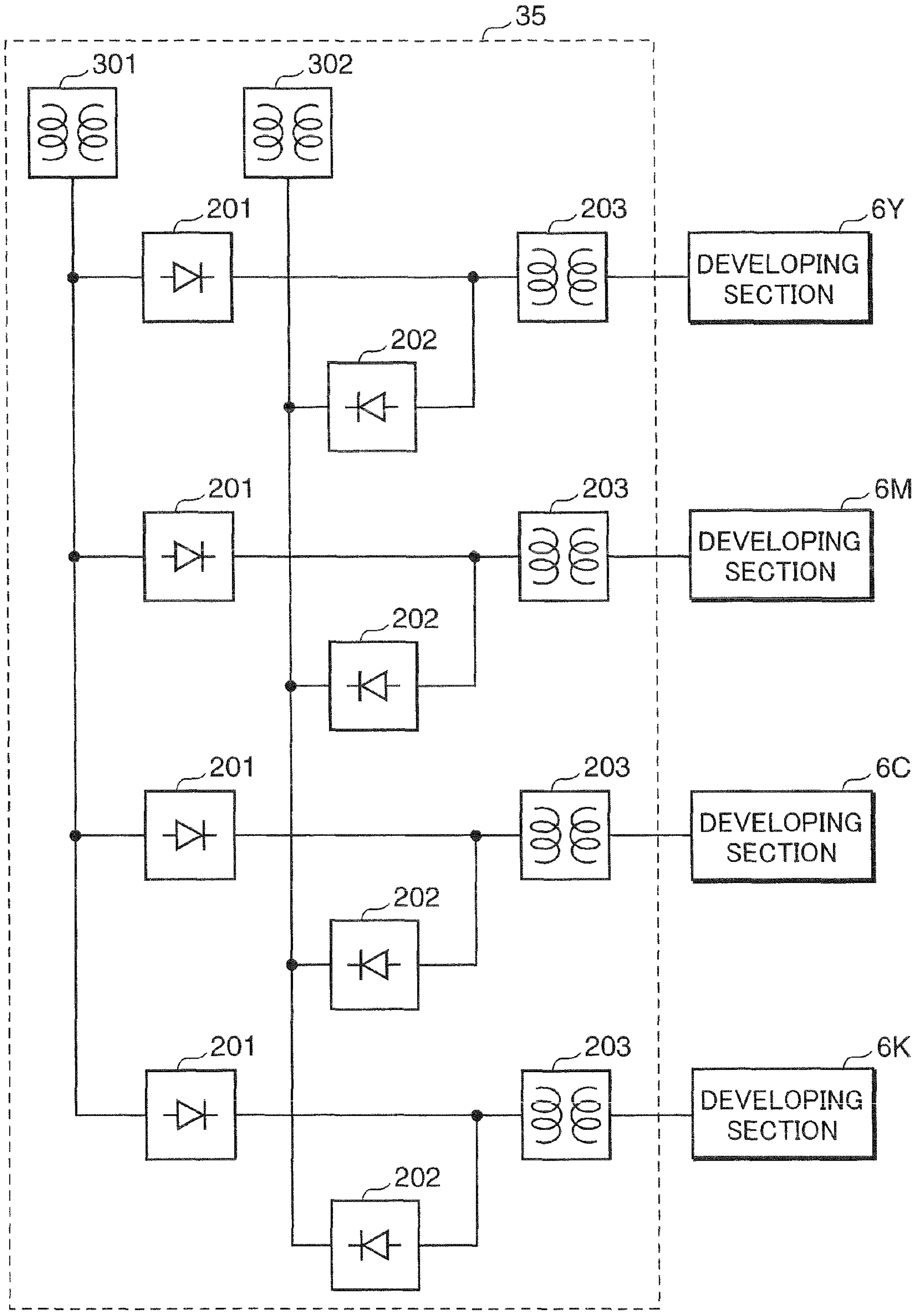
FIG. 4 is a schematic diagram showing a configuration of a power source apparatus in accordance with an embodiment of the present invention.

In view of such problems, the present invention proposes a power source apparatus 35 (first embodiment of the present invention) shown in FIG. 4. The power source apparatus 35 includes a transformer (second transformer) 301, a transformer (third transformer) 302, rectifying circuits (first rectifiers) 201, rectifying circuits (second rectifiers) 202, and AC circuits (first transformers) 203. The transformer 301 accepts an AC voltage from an unillustrated AC power source, transforms the AC voltage, and supplies the transformed AC voltage to four rectifying circuits 201. Similarly, the transformer 302 accepts an AC voltage from an unillustrated AC power source, transforms the AC voltage, and supplies the AC voltage to four rectifying circuits 202. The rectifying circuits 201 convert the accepted AC voltage to a positive DC voltage, and the rectifying circuits 202 convert the accepted AC voltage to a negative DC voltage.

The power source apparatus 35 is provided with a connection line which superimposes the positive DC voltage and the negative DC voltage with each other. The superimposed DC voltage is outputted to the AC circuit 203. The AC circuit 203 has a transformer inside and the superimposed DC voltage is outputted to a secondary side of the transformer. In other words, the AC voltage outputted from the transformers included in the AC circuit 203 and the DC voltage formed by superimposing the positive and negative DC voltage outputted from the rectifying circuits 201 and 202 are further superimposed with each other. Then, the voltage formed by superimposing the DC voltage with the AC voltage is supplied to the developing sections 6.

The transformers 301 and 302, the rectifying circuits 201 and 202, and the AC circuits 203 accept control signals corresponding to respective colors from the controller 31, and operations of the elements are controlled in accordance with the control signals. In other words, each element is driven in accordance with the control signals, and the output voltage level and the like are adjusted. Further, the transformer 301 and the rectifying circuits 201 correspond to a first DC power source, and the transformer 302 and the rectifying circuits 202 correspond to a second DC power source.

Figure 5:
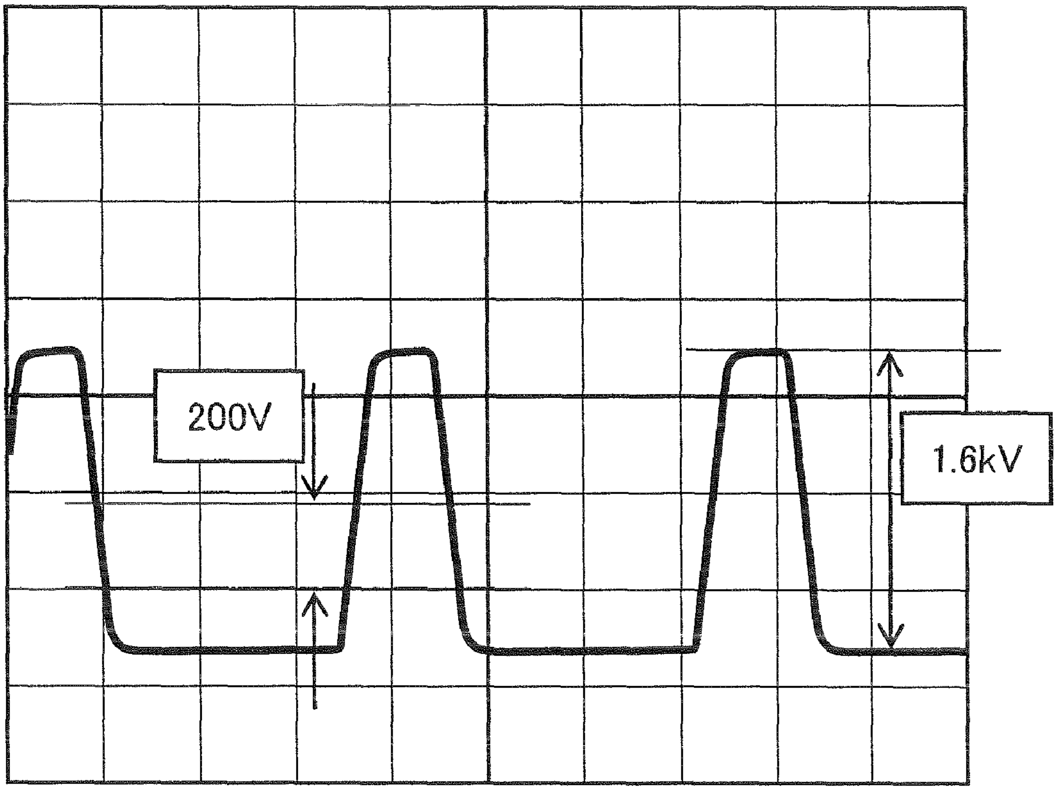
FIG. 5 shows a voltage waveform of a voltage supplied to a developing section.

FIG. 5 shows a voltage waveform of a voltage supplied to the developing sections 6. The voltage waveform shows a state where a DC voltage of +200V is superimposed to an AC voltage having a frequency of 3 kHz, a positive duty of 30%, and a peak voltage of 1.6 kV, thereby shifting the AC voltage. The frequency, the duty, the peak voltage, and the shifting amount are suitably controlled depending on a condition under which image forming is performed.

As described above, common transformers for supplying the AC voltage to the plurality of rectifying circuits 201 and 202 are provided. Accordingly, as compared to the conventional manner, the number of required transformers can be reduced from eight to two. In other words, reducing the number of transformers can realize reduction of the cost and size of the power source apparatus 35.

The present invention is not limited to the aforementioned embodiment, and it can be modified in various ways.

Figure 6:
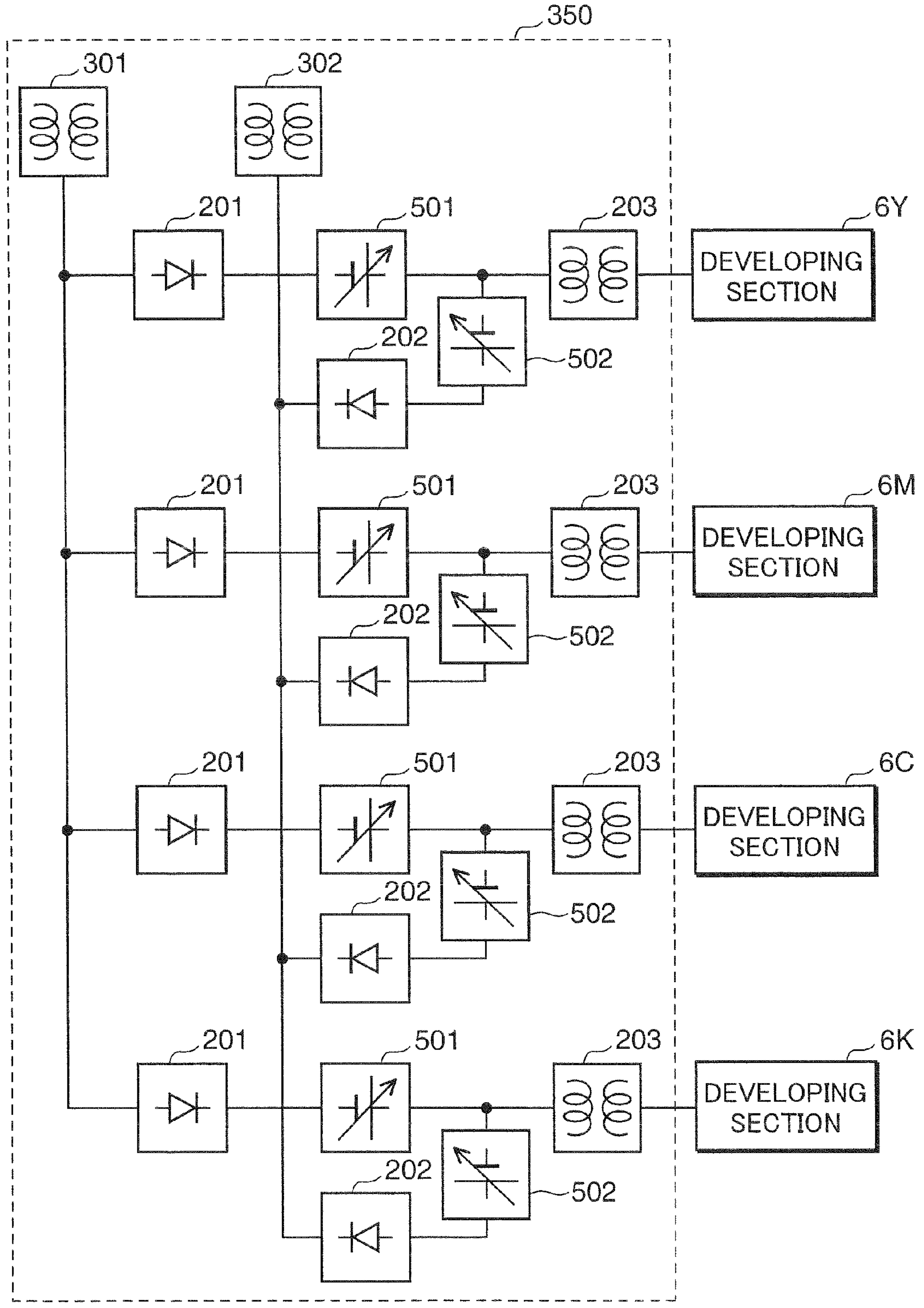
FIG. 6 is a schematic diagram showing a configuration of a power source apparatus in accordance with a first modification of the power source apparatus shown in FIG. 4.

FIG. 6 shows a first modification of the power source apparatus shown in FIG. 4.

A power source apparatus 350 shown in FIG. 6 includes, in addition to the configuration of the power source apparatus 35 shown in FIG. 4, voltage control circuits (first voltage controllers) 501 which perform a voltage control with respect to a positive DC voltage outputted from the rectifying circuit 201, and voltage control circuits (second voltage controllers) 502 which perform a voltage control with respect to a negative DC voltage outputted from the rectifying circuits 202. In other words, the number of voltage control circuits 501 and the number of voltage control circuits 502 are the same as the numbers of rectifying circuits 201, rectifying circuits 202, and AC circuits 203. The positive DC voltage outputted from the voltage control circuits 501 and the negative DC voltage outputted from the voltage control circuits 502 are superimposed with each other, and the superimposed DC voltage is superimposed with the AC voltage outputted from the AC circuits 203.

Figure 7:
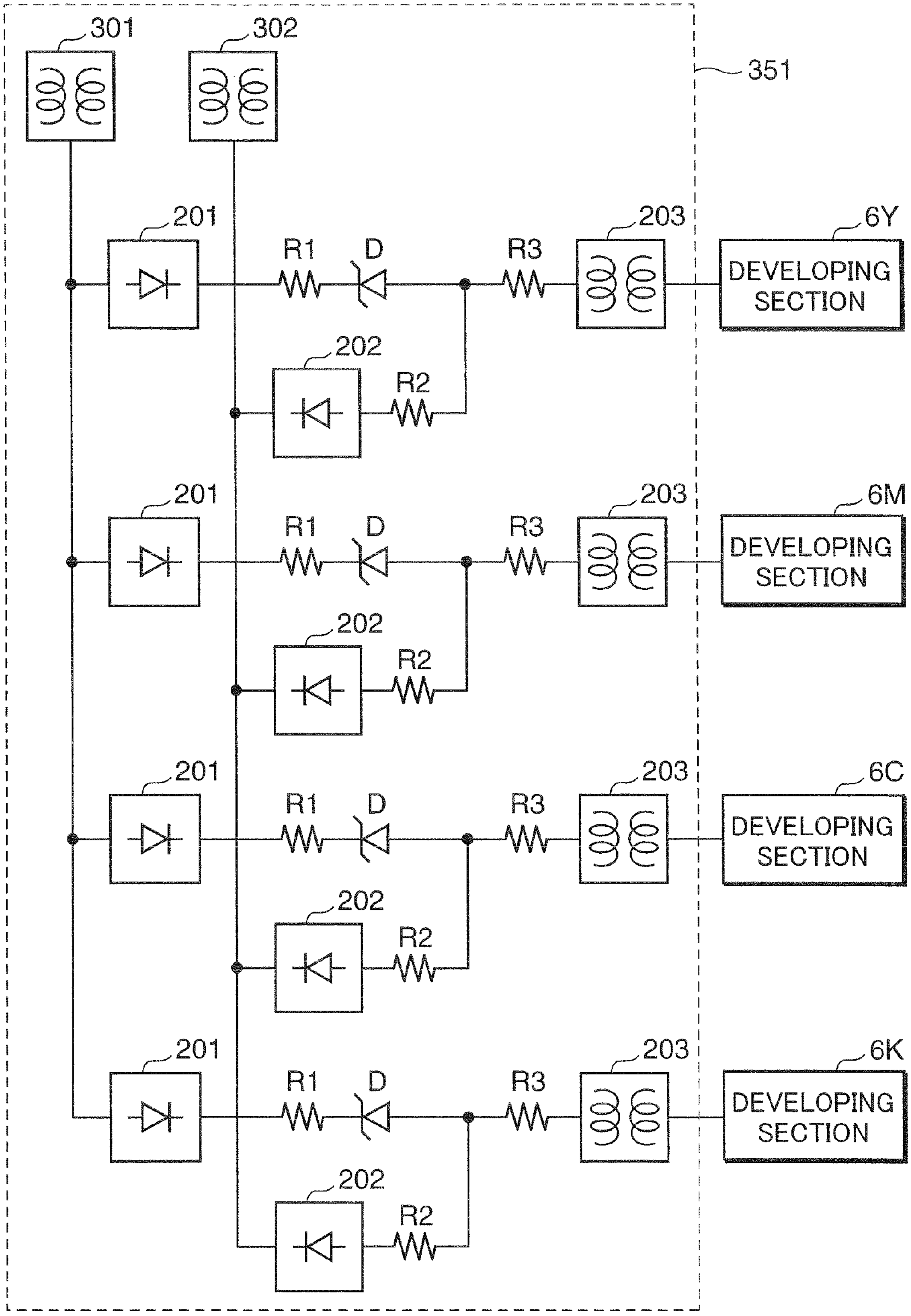
FIG. 7 is a schematic diagram showing a configuration of a power source apparatus in accordance with a second modification of the power source apparatus shown in FIG. 4.

A power source apparatus 351 shown in FIG. 7 is a second modification of the power source apparatus shown in FIG. 4.

The power source apparatus 351 includes the following configuration in addition to the power source apparatus 35 shown in FIG. 4. In other words, as shown in FIG. 7, in the power source apparatus 351, the positive DC voltage outputted from the rectifying circuits 201 and the negative DC voltage outputted from the rectifying circuits 202 are superimposed with each other through the resistances R1-R3 and Zener diodes D and then outputted to the AC circuits 203. The AC circuit 203 has a transformer therein, and the superimposed DC voltage is outputted to a secondary side of the transformer.

Figure 8:
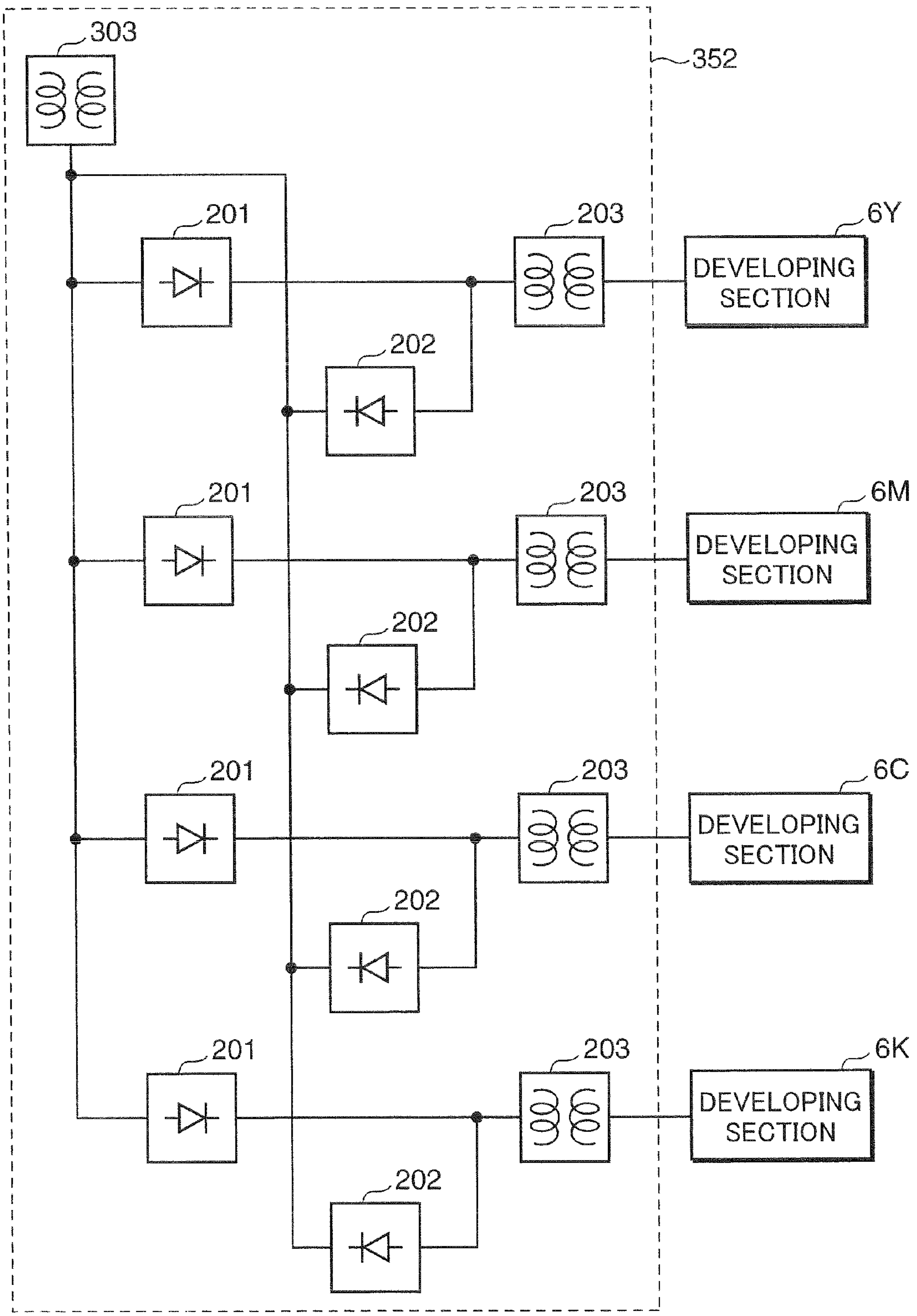
FIG. 8 is a schematic diagram showing a configuration of a power source apparatus in accordance with a third modification of the power source apparatus shown in FIG. 4.

A power source apparatus 352 shown in FIG. 8 is a third modification of the power source apparatus shown in FIG. 4. The power source apparatus 35 shown in FIG. 4 includes two transformers, where one is the transformer 301 which supplies an AC voltage to the rectifying circuits 201, and the other is the transformer 302 which supplies an AC voltage to the rectifiers 202. In the power source apparatus 352 shown in FIG. 8, the transformers 301 and 302 are aggregated, so that one transformer (central transformer) 303 supplies an AC voltage to all of the rectifying circuits 201 and rectifying circuits 202. Accordingly, the number of transformers can be further reduced.

Figure 9:
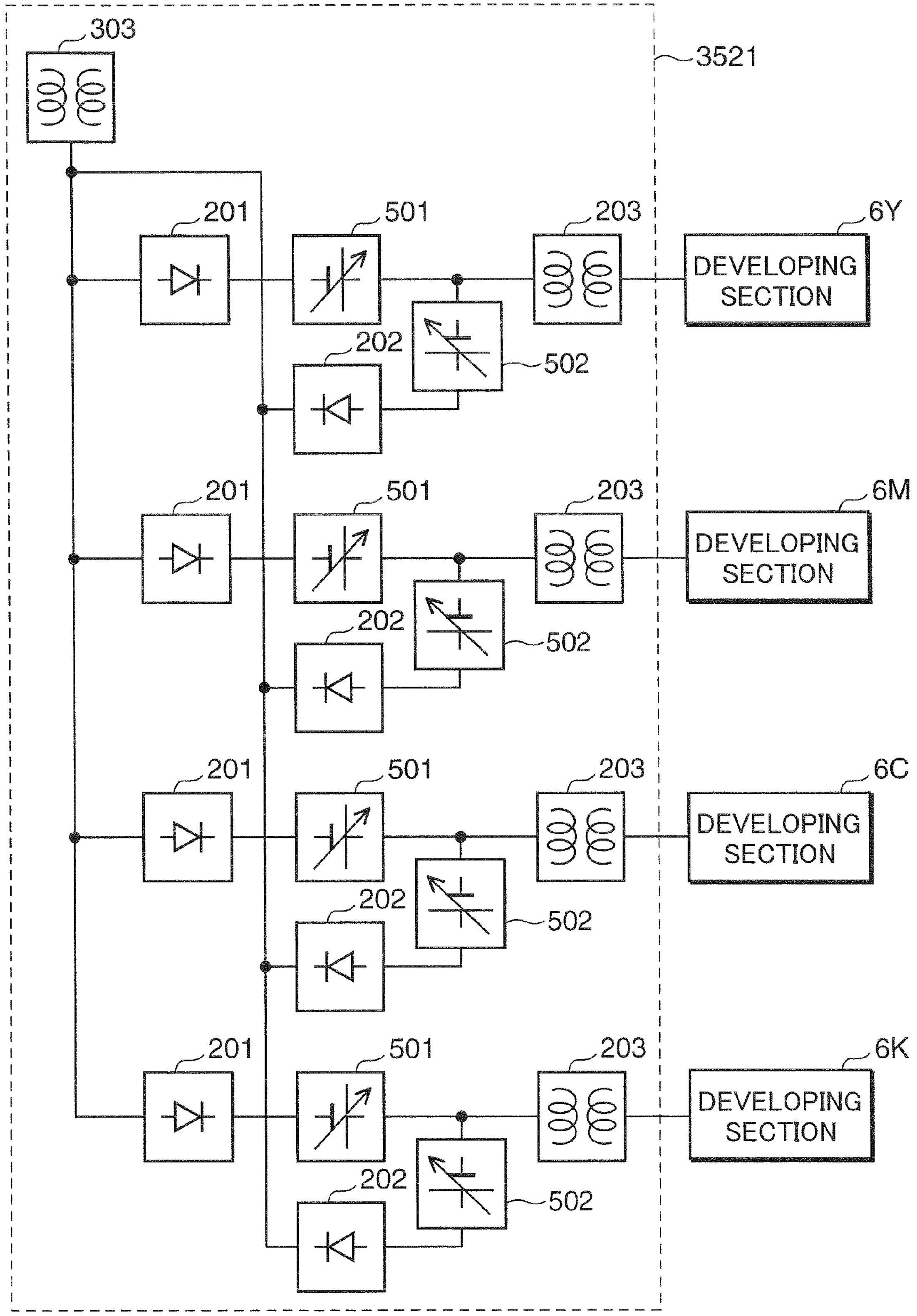
FIG. 9 is a schematic diagram showing a configuration of a power source apparatus in accordance with a modification of the power source apparatus shown in FIG. 8.

The power source apparatus 3521 shown in FIG. 9 is a modification of the power source apparatus 352 shown in FIG. 8. The power source apparatus 3521 shown in FIG. 9 includes, in addition to the configuration of the power source apparatus 352 shown in FIG. 8, voltage control circuits 501, which perform a voltage control with respect to the positive DC voltage outputted from the rectifying circuits 201, and voltage control circuits 502 which perform a voltage control with respect to the negative DC voltage outputted from the rectifying circuits 202. In other words, the numbers of voltage control circuits 501 and voltage control circuits 502 are the same as the numbers of the rectifying circuits 201, rectifying circuits 202, and AC circuits 203. Then, the positive DC voltage outputted from the voltage control circuit 501 and the negative DC voltage outputted from the voltage control circuit 502 are superimposed with each other, and the superimposed DC voltage is superimposed to the AC voltage outputted from the AC circuits 203.

Figure 10:
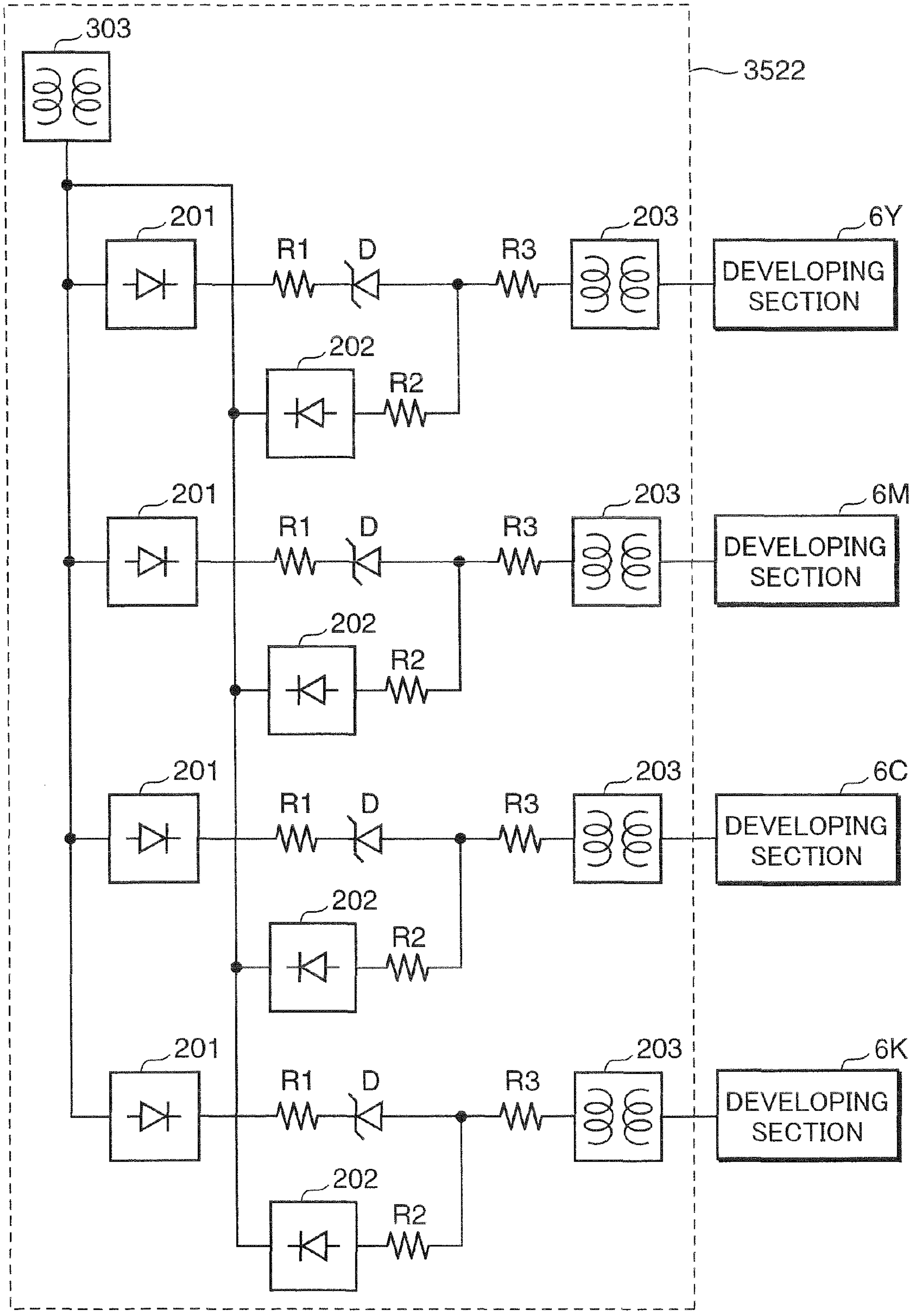
FIG. 10 is a schematic diagram showing a configuration of a power source apparatus in accordance with another modification of the power source apparatus shown in FIG. 8.

A power source apparatus 3522 shown in FIG. 10 is another modification of the power source apparatus 352 shown in FIG. 8. The power source apparatus 3522 shown in FIG. 10 includes the following configuration in addition to the power source apparatus 352 shown in FIG. 8. In other words, as shown in FIG. 10, in the power source apparatus 3522, the positive DC voltage outputted from the rectifying circuits 201 and the negative DC voltage outputted from the rectifying circuits 202 are superimposed with each other through the resistances R1-R3 and the Zener diodes D, and the superimposed DC voltage is outputted to the AC circuits 203. The AC circuit 203 has a transformer therein, and the superimposed DC voltage is outputted to a secondary side of the transformer.

Figure 11:
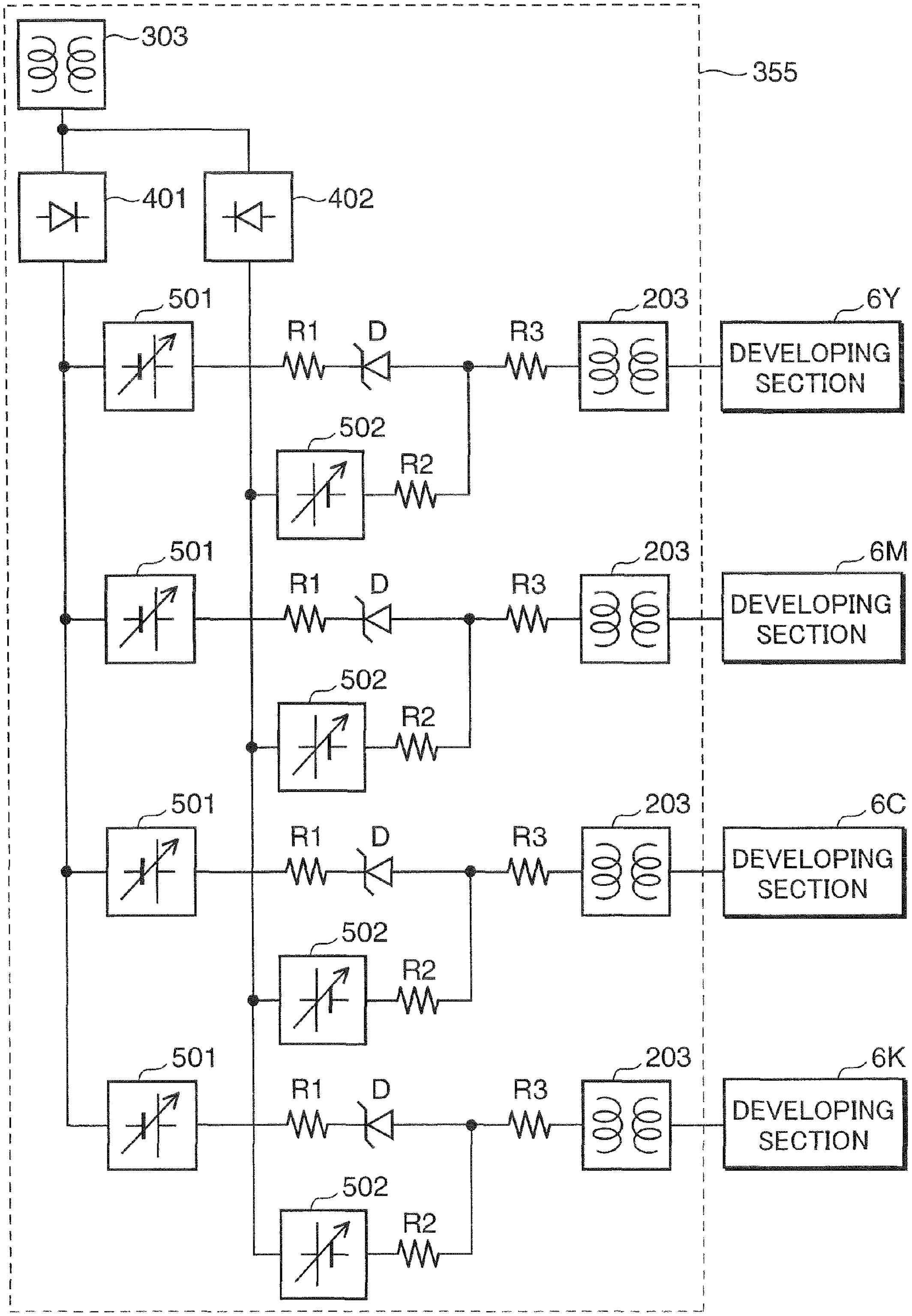
FIG. 11 is a schematic diagram showing a configuration of a power source apparatus in accordance with another modification of the power source apparatus shown in FIG. 4.

FIG. 11 shows another modification of the power source apparatus 35 shown in FIG. 4.

In the power source apparatus 355 shown in FIG. 11, rectifying circuits are aggregated to be one. The power source apparatus 355 shown in FIG. 11 supplies the AC voltage outputted from one transformer 303 to rectifying circuits 401 and 402. The rectifying circuit 401 converts an accepted AC voltage to a positive DC voltage and outputs the positive DC voltage to four power source control circuits 501. The voltage control circuits 501 controls the DC voltage in accordance with a control signal outputted from the controller 31. Similarly, the rectifying circuit 402 converts the accepted AC voltage to a negative DC voltage and outputs the negative DC voltage to four control circuits 502. The voltage control circuits 502 adjust levels of the DC voltage which is outputted in accordance with controls signals of respective colors outputted from the controller 31.

The positive DC voltage outputted from the voltage control circuits 501 and the negative DC voltage outputted from the voltage control circuit 502 are superimposed with each other through the resistances R1-R3 and the Zener diodes D, and the superimposed DC voltage is outputted to the AC circuits 203. The AC circuit 203 has a transformer therein, and the superimposed DC voltage is outputted to a secondary side of the transformer. As described above, the rectifying circuits are aggregated, so that the cost and size of the apparatus can be further reduced.

As described above, the power source apparatuses mentioned in the embodiments above generate a voltage to be applied to the developing sections 6. However, it is not limited to that the voltage is applied only to the developing sections 6. For example, the voltage may be applied to the charging sections 4.

In summary, according to an aspect of the present invention, a power source apparatus includes: a plurality of first transformers which transform an input voltage and outputs an AC voltage; a first DC power source including: one second transformer; and a plurality of first rectifiers which convert an AC voltage outputted from the second transformer into a positive DC voltage and output the positive DC voltage, the number of the first rectifiers being the same as the plurality of first transformers; a second DC power source including: one third transformer; and a plurality of second rectifiers which convert an AC voltage outputted from the third transformer into a negative DC voltage and output the negative DC voltage, the number of the second rectifiers being the same as the plurality of first transformers. A connection line is provided which superimposes the positive DC voltage outputted from the first rectifiers with the negative DC voltage outputted from the second rectifiers, and superimposes the superimposed DC voltage with the AC voltage outputted from the first transformer.

According to this aspect of the invention, a single second transformer supplies an AC voltage to a plurality of first rectifiers, and a single third transformer supplies an AC voltage to a plurality of second rectifiers. Accordingly, as compared to the conventional apparatus, the number of transformers can be reduced. Therefore, the cost and size of the power source apparatus can be reduced.

For example, according to the conventional apparatus, in an image forming apparatus such as a color printer, one power source apparatus has been required for each developing apparatus of a respective color (yellow, magenta, cyan, and black). Therefore, a plurality of power source apparatuses have been required, and a large number of parts such as a transformer constituting a power source apparatus have been required, thereby raising the cost of the apparatus. However, the cost can be reduced as compared to the conventional apparatus.

Further, Japanese Unexamined Patent Publication No. 2006-317524 discloses a technology of using a common transformer for synchronization of phases of the AC voltage. However, this technology cannot be applied in the case where the DC voltage is supplied. In such case where the DC voltage is supplied, the present invention can reduce the number of transformers as compared to the conventional apparatus, so that the cost and size of the power source apparatus can be reduced.

Further, according to an aspect of the present invention, the second transformer and the third transformer constitute a central transformer, and the central transformer outputs an AC voltage to both the first rectifiers and the second rectifiers.

According to this aspect of the present invention, a single central transformer supplies an AC voltage to a plurality of first rectifiers and a plurality of second rectifiers, so that the number of transformers can be reduced as compared to the conventional apparatus. Therefore, reduction in the cost and size of the power source apparatus can be achieved.

Further, according to an aspect of the present invention, the power source apparatus further includes: a plurality of first voltage controllers which perform a voltage control with respect to the positive DC voltage outputted from the first DC power source or the first rectifiers, the number of the first controllers being the same as the plurality of first transformers; and a plurality of second voltage controllers which perform a voltage control with respect to the negative DC voltage outputted from the second DC power source or the second rectifiers, the number of the second voltage controllers being the same as the plurality of first transformers. The positive DC voltage outputted from the first voltage controllers and the negative DC voltage outputted from the second voltage controller are superimposed with each other, and the superimposed DC voltage is superimposed with the AC voltage outputted from the first transformers.

According to this invention, the positive DC voltage outputted from the first DC power source or the first rectifiers is supplied to a plurality of voltage controllers, and the negative DC voltage outputted from the second DC power source or the second rectifiers is supplied to a plurality of voltage controllers. Accordingly, the number of transformers can be reduced as compared to the conventional apparatus. Therefore, reduction in the cost and size of the power source apparatus can be achieved.

Further, according to another aspect of the present invention, a power source apparatus includes: a plurality of first transformers which transform an input voltage and outputs an AC voltage; a DC power source including: one second transformer; a first rectifier which converts the AC voltage outputted from the second transformer into a positive DC voltage and output the DC voltage; and a second rectifier which converts an AC voltage outputted from the second transformer into a negative DC voltage and outputs the DC voltage; a plurality of first voltage controllers which perform a voltage control with respect to the positive DC voltage outputted from the first rectifier, the number of the first voltage controllers being the same as the plurality of first transformers; a plurality of second voltage controllers which perform a voltage control with respect to the negative DC voltage outputted from the second rectifier, the number of the second voltage controllers being the same as the plurality of first transformers. A connection line is provided which superimposes the positive DC voltage outputted from the first voltage controllers with the negative DC voltage outputted from the second voltage controllers, and superimposes the superimposed DC voltage with the AC voltage outputted from the first transformers.

According to this invention, a single second transformer supplies an AC voltage to first rectifiers and second rectifiers, and the positive DC voltage outputted from the first rectifiers is supplied to a plurality of first voltage controllers, and further the negative DC voltage outputted from the second rectifiers is supplied to a plurality of second voltage controllers. Accordingly, the number of rectifiers and transformers can be reduced as compared to the conventional apparatus. Therefore, reduction in the cost and size of the power source apparatus can be achieved.

Further, according to an aspect of the present invention, the positive DC voltage and the negative DC voltage which are outputted respectively from the first rectifier and the second rectifier are superimposed with each other through Zener diodes.

According to this aspect of the present invention, irrelevant flow of electric current to the first rectifiers and the second rectifiers can be prevented.

Further, according to another aspect of the present invention, an image forming apparatus includes a plurality of developing sections which use developing agent to develop electrostatic latent images formed on image bearing members; and a power source apparatus according to the aforementioned aspect of the present invention which applies a voltage to the developing sections.

This application is based on Japanese Patent application serial No. 2008-082544 filed in Japan Patent Office on Mar. 27, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A power source apparatus, comprising:

a plurality of first transformers which transform an input voltage and outputs an AC voltage;

a first DC power source including: one second transformer; and a plurality of first rectifiers which convert an AC voltage outputted from the second transformer into a positive DC voltage and output the positive DC voltage, the number of the first rectifiers being the same as the plurality of first transformers;

a second DC power source including: one third transformer; and a plurality of second rectifiers which convert an AC voltage outputted from the third transformer into a negative DC voltage and output the negative DC voltage, the number of the second rectifiers being the same as the plurality of first transformers;

a plurality of first voltage controllers which perform a voltage control with respect to the positive DC voltage outputted from the first DC power source, the number of the first voltage controllers being the same as the plurality of first transformers; and a plurality of second voltage controllers which perform a voltage control with respect to the negative DC voltage outputted from the second DC power source, the number of the second voltage controllers being the same as the plurality of first transformers, wherein a connection line is provided which superimposes the positive DC voltage outputted from the first rectifiers with the negative DC voltage outputted from the second rectifiers, and superimposes the superimposed DC voltage with the AC voltage outputted from the first transformers, and the positive DC voltage outputted from the first voltage controllers and the negative DC voltage outputted from the second voltage controller are superimposed with each other, and the superimposed DC voltage is superimposed with the AC voltage outputted from the first transformers.

2. A power source apparatus, comprising:

a plurality of first transformers which transform an input voltage and outputs an AC voltage;

a first DC power source including: one second transformer; and a plurality of first rectifiers which convert an AC voltage outputted from the second transformer into a positive DC voltage and output the positive DC voltage, the number of the first rectifiers being the same as the plurality of first transformers;

a second DC power source including: one third transformer; and a plurality of second rectifiers which convert an AC voltage outputted from the third transformer into a negative DC voltage and output the negative DC voltage, the number of the second rectifiers being the same as the plurality of first transformers, wherein a connection line is provided which superimposes the positive DC voltage outputted from the first rectifiers with the negative DC voltage outputted from the second rectifiers, and superimposes the superimposed DC voltage with the AC voltage outputted from the first transformers, and the positive DC voltage and the negative DC voltage which are outputted respectively from the first rectifiers and the second rectifiers are superimposed with each other through Zener diodes.

3. A power source apparatus, comprising:

a plurality of first transformers which transform an input voltage and outputs an AC voltage;

a first DC power source including: one second transformer; and a plurality of first rectifiers which convert an AC voltage outputted from the second transformer into a positive DC voltage and output the positive DC voltage, the number of the first rectifiers being the same as the plurality of first transformers;

a second DC power source including: one third transformer; and a plurality of second rectifiers which convert an AC voltage outputted from the third transformer into a negative DC voltage and output the negative DC voltage, the number of the second rectifiers being the same as the plurality of first transformers, wherein a connection line is provided which superimposes the positive DC voltage outputted from the first rectifiers with the negative DC voltage outputted from the second rectifiers, and superimposes the superimposed DC voltage with the AC voltage outputted from the first transformers, the second transformer and the third transformer constitute a central transformer, and the central transformer outputs an AC voltage to both the first rectifiers and the second rectifiers.

4. The power source apparatus according to claim 3, further comprising:

a plurality of first voltage controllers which perform a voltage control with respect to the positive DC voltage outputted from the first rectifiers, the number of the first voltage controllers being the same as the plurality of first transformers; and a plurality of second voltage controllers which perform a voltage control with respect to the negative DC voltage outputted from the second rectifiers, the number of the second voltage controllers being the same as the plurality of first transformers, wherein the positive DC voltage outputted from the first voltage controllers and the negative DC voltage outputted from the second voltage controller are superimposed with each other, and the superimposed DC voltage is superimposed with the AC voltage outputted from the first transformers.

5. The power source apparatus according to claim 3, wherein the positive DC voltage and the negative DC voltage which are outputted respectively from the first rectifiers and the second rectifiers are superimposed with each other through Zener diodes.

6. A power source apparatus comprising:

a plurality of first transformers which transform an input voltage and outputs an AC voltage;

a DC power source including: one second transformer; a first rectifier which converts the AC voltage outputted from the second transformer into a positive DC voltage and outputs the DC voltage; and a second rectifier which converts an AC voltage outputted from the second transformer into a negative DC voltage and outputs the DC voltage;

a plurality of first voltage controllers which perform a voltage control with respect to the positive DC voltage outputted from the first rectifier, the number of the first voltage controllers being the same as the plurality of first transformers;

a plurality of second voltage controllers which perform a voltage control with respect to the negative DC voltage outputted from the second rectifier, the number of the second voltage controllers being the same as the plurality of first transformers, wherein a connection line is provided which superimposes the positive DC voltage outputted from the first voltage controllers with the negative DC voltage outputted from the second voltage controllers, and superimposes the superimposed DC voltage with the AC voltage outputted from the first transformers.

7. The power source apparatus according to claim 6, wherein the positive DC voltage and the negative DC voltage which are outputted respectively from the first rectifier and the second rectifier are superimposed with each other through Zener diodes.

* * * * *